(12) United States Patent
Reifenhaeuser (10) Patent No.: US 8,758,099 B2
(45) Date of Patent: Jun. 24, 2014

(54) METHOD AND DEVICE FOR WEIGHT PRECISE CUTTING OF A FOOD STRAND

(71) Applicant: Uwe Reifenhaeuser, Flammersfeld (DE)

(72) Inventor: Uwe Reifenhaeuser, Flammersfeld (DE)

( * ) Notice: Subject to any disclaimer, the term of this patent is extended or adjusted under 35 U.S.C. 154(b) by 0 days.

(21) Appl. No.: 13/851,460

(22) Filed: Mar. 27, 2013

(65) Prior Publication Data

US 2013/0260660 A1   Oct. 3, 2013

(30) Foreign Application Priority Data

Mar. 27, 2012  (DE) .......................... 10 2012 102 649

(51) Int. Cl.
*A22C 18/00* (2006.01)

(52) U.S. Cl.
USPC .......................................................... 452/157

(58) Field of Classification Search
USPC .................. 452/149, 150–153, 155–157, 160
See application file for complete search history.

(56) References Cited

U.S. PATENT DOCUMENTS

| | | | | |
|---|---|---|---|---|
| 5,668,634 | A * | 9/1997 | Newman | 356/445 |
| 6,104,966 | A * | 8/2000 | Haagensen | 700/116 |
| 6,547,658 | B2 * | 4/2003 | Boody et al. | 452/171 |
| 6,882,434 | B1 * | 4/2005 | Sandberg et al. | 356/601 |
| 7,623,249 | B2 * | 11/2009 | Sandberg et al. | 356/601 |
| 7,841,264 | B2 * | 11/2010 | Kim et al. | 83/13 |
| 8,025,000 | B2 * | 9/2011 | Kim et al. | 83/13 |
| 8,166,856 | B2 * | 5/2012 | Kim et al. | 83/13 |

FOREIGN PATENT DOCUMENTS

| | | |
|---|---|---|
| DE | 10136809 A1 | 2/2003 |
| DE | 60034332 T2 | 4/2007 |
| EP | 1044770 A1 | 10/2000 |
| EP | 1046478 A1 | 10/2000 |
| GB | 2377362 A | 1/2003 |
| WO | WO 02/061368 A2 | 8/2002 |

* cited by examiner

*Primary Examiner* — Richard Price, Jr.
(74) *Attorney, Agent, or Firm* — Von Rohrscheidt Patents (57) ABSTRACT

A method for cutting a food strand into portions including the steps:
  feeding the food strand through a feed device towards a cutting device;
  continuously measuring a cross section of the food strand during feeding with a measuring device;
  continuously generating a marking on a surface of the food strand through a marking device;
  continuously detecting the marking through three first detectors arranged on identical sides of the marking with respect to the feed direction;
  continuously determining a size of a cross sectional surface of the food strand through a processing device from image data generated by the first detectors and a fourth detector;
  controlling the cutting device and/or the feed device through a control device using data of the size of the cross sectional surface; and
continuously detecting the marking through a fourth detector arranged on another side of the marking than the three first detectors.

10 Claims, 6 Drawing Sheets

METHOD AND DEVICE FOR WEIGHT PRECISE CUTTING OF A FOOD STRAND

RELATED APPLICATIONS

This application claims priority from German application DE 10 2012 102 649.1 filed on Mar. 27, 2012, which is incorporated in its entirety by this reference.

FIELD OF THE INVENTION

The invention relates to a method for cutting at least one food strand into portions with precise weights.

BACKGROUND OF THE INVENTION

A method and a device of the general type described supra is for example known from GB 2 377 362 A. They are essential in particular for the so called weight precise cutting since food strands with irregular shapes, typically naturally grown food strands, for example pork chop strands are typically cut into individual slices which shall have uniform masses. The requirement to produce identical package weights for the sale of the products is of interest for example in self service sections of super markets.

In the method disclosed in GB 2 377 362 A, a marking is generated on a surface of the food strand to be cut through four lasers respectively arranged offset by 90° in circumferential direction and oriented in a projection plane orthogonal to the feed direction. This marking is detected by three cameras, wherein two cameras are arranged above the conveyor belt elements separated by a transition gap (gap portion) and one camera is arranged below the conveyor belt elements. The three cameras and their optical axes are arranged within the same plane, this means the projection plane in which the marking is generated through the four lasers.

This system yields satisfactory results in a center portion of the food strand, in particular when the surface is relatively smooth and also facilitates continuous measuring and cutting operations with higher feed velocities and smaller offsets between the projection plane and the subsequent cutting plane with reasonable computing power. The known system, however, has a weakness when measuring end pieces and irregular surface contours, in particular including cavities extending into the food strand at a slant angle. In this case shadowing occurs in particular for irregular convex cambered end pieces and cavities with small curvature radii which prevent a reliable detection of the pattern generated by the lasers through the cameras.

DE 101 36809 A1 respectively using a light emitter and a camera furthermore also describes the technology for which the instant application provides an improvement. The emitter, for example a laser, projects light onto the food strand so that the reflection generates an optical edge contour on the food strand. The light is thus radiated on the food strand so that the contour extends perpendicular to a feed direction of the food strand. The edge contour can be subsequently captured by the camera and can be subsequently processed by a processor unit, wherein a cross sectional surface of the food strand can be determined. Knowing a mean density of the food strand facilitates computing which cutting thickness of a slice cut off from the food strand yields a precise predetermined mass.

Similar to this method WO 02/061368 A2 illustrates a device which also uses an emitter and a camera for determining a cross section surface of a food stand. This application relates in particular to the problem that a reliable determination of the edge contour or of the surface of the food strand is not easily possible in cases in which the food strand has a highly irregular structure as can be the case of strands of pork chops. Irregularities cause in particular the problem of shadowing particular portions as soon as the light emitted by the light emitter cannot reach every location of the cross section any more due to the irregular shape of the food strand so that the edge contour consequently "disappears" in these portions. Measuring errors and lack of precision of the masses of the particular slices come as a consequence. As a solution for this problem WO 02/061368 A2 proposes arranging mirrors around the food strand through which the food strand can be viewed from different viewing points. Thus, the mirrors are effective for the light emitted by the light emitter and also for the camera which shall capture the edge contour generated on the food strand.

An alternative option for precisely determining even complex cross section geometries and cross section surfaces of a food strand resulting therefrom is provided by the devices with the types IPM 3×300 and I-Cut 36 of the Marel hf. company. In particular the latter model uses three cameras instead of mirrors in order to avoid a shadowing of the edge contour projected with a laser on the food strand. Viewed in feed direction of the food strand two of the three cameras are positioned at a slanted lower position below the food strand while the third camera is arranged above the food strand. The "viewing directions" of the cameras are oriented in feed direction of the food strand, this means the cameras are arranged viewed in feed direction of the food strand in front of the edge contour generated by the light emitter and monitor the edge contour. By arranging three cameras about the food strand the edge contour on the food strand can be observed in a rather reliable manner, wherein shadowing and therefore imprecise cutting is reduced.

Though this device provides sufficient precision for some applications with respect to mass deviations of the particular slices of the food strand a safe prevention of shadowing of the edge contour which makes the edge contour invisible and not monitorable by the cameras cannot be safely provided by this device in all cases.

DE 600 332 T2 further discloses a cutting machine with automatic scanning of the food strand. Also in this machine measuring the cross sectional surface, this means computing disc thicknesses continuously during feeding and cutting operations is continuously provided. However, the product is pushed over thin horizontal support rods in the measuring device during feeding through feed fingers engaging a face. Generating the marking through two lasers and also detecting the marking through two cameras is thus performed without being impeded by conveyor belt elements which only leave a gap portion open between one another in order to reach the surface of the food strand from below. A marking laser and an associated camera are arranged above the support rods used as a support for the food strand and another marking laser including the associated camera is arranged below the support rod. The results of the measurement from the bottom side are flawed accordingly since the marking on the food strand is incomplete due to the plurality of support rods so that interpolation processes are required for the shadowed portions, which has a negative effect on precision. Based on the only two cameras furthermore imprecisions at the vertically aligned side surfaces are also only detectable incompletely.

Eventually EP 1 044 770 A1 and EP 1 046 478 A1 respectively disclose a method and a device for cutting particular components with predetermined weights from a piece of smoked ham. Measuring the food strand, in particular determining its cross sectional surface over its extension in feed direction is performed on a measuring table on which the product stands still during measuring. Thus, the product is supported according to EP 1 044 770 A1 by thin wires during measuring, whereas it is placed on a transparent glass plate according to EP 1 046 478 A1. In both cases the marking laser and also cameras are provided for detecting the marking on the top side of the ham, thus respectively plural marking lasers and cameras which are directed onto the food strand from above and also plural marking lasers and cameras which are directed onto the food strand from below. Thus, one respective marking laser (projector) and a camera interact as a pair. Since the food strand is standing still during measurement, there is sufficient time to process the plurality of images generated through a computer in order to determine the contour of the food strand. However, the known projector and camera technique and arrangement is not suitable for a method in which the measurement and evaluation of the measurement data obtained has to be continuously performed with uninterrupted feeding in order to be able to determine and adjust the required slice thickness in time before reaching the cutting plane.

BRIEF SUMMARY OF THE INVENTION

Technical Object

The present invention shall improve the devices and methods described supra so that a weight precise cutting of particular slices of a food strand is provided with better precision.

Solution

The object is achieved by improving upon the method recited supra in that the current marking is continuously detected from an additional viewing angle by a fourth detector which is arranged in feeding direction on an opposite side of the marking compared to the three other detectors.

The object is achieved in particular through a method for cutting at least one food strand into portions with precise weights, comprising the steps:

feeding the food strand through a feed device in a feed direction relative to a machine frame towards a cutting device, wherein a longitudinal axis of the food strand extends parallel to the feed direction;

continuously measuring a respective cross section of the food strand during feeding with a measuring device at different locations of the food strand along the longitudinal axis of the food strand while the food strand passes through the measuring device;

continuously generating a marking on a surface of the food strand through a marking device of the measuring device that is fixated relative to a machine frame, wherein the marking is generated partially through a transition gap between two sequential conveyor belt elements, wherein the marking moves relative to the food strand in a direction of its longitudinal axis due to a feed movement of the food strand;

continuously detecting the marking through three first detectors respectively fixated relative to the machine frame, wherein the detecting is performed partially through a transition gap between the two sequential conveyor belt elements from different viewing angles, wherein the first detectors are arranged on identical sides of the marking with respect to the feed direction;

continuously detecting the marking through a fourth detector from another viewing angle with reference to the feed direction than the three first detectors, wherein the fourth detector is arranged on another side of the marking than the three first detectors with reference to the feed direction;

continuously determining a size of a cross sectional surface of the food strand through a processing device of the measuring device from image data generated by the first detectors and the fourth detector; and controlling the cutting device and/or the feed device through a control device using data of the size of the cross sectional surface so that sequential portions with precise weights are cut off from a front end of the food strand.

The object is also achieved through a device for cutting a food strand into portions with precise weights, comprising:

a feed device through which a food strand is feedable in a feed direction, wherein a longitudinal axis of the food strand is oriented parallel to the feed direction during a feed movement;

a cutting device to which the food strand is feedable through the feed device;

a measuring device through which a cross sectional surface of the food strand is continuously determinable during feeding at different locations of the food strand with respect to the longitudinal axis of the food strand passing through the measuring device;

a marking device of the measuring device, wherein a marking is continuously generatable on a surface of the food strand through the marking device partially through a transition gap between sequential conveyor belt elements, wherein the marking moves relative to the food strand in a direction of the longitudinal axis of the food strand due to the feed movement;

three first detectors of the measuring device, wherein the marking is continuously detectable through the first detectors from different viewing angles partially through a transition gap between two sequential conveyor belts, wherein the first detectors are arranged on identical sides of the marking relative to the feed direction;

a fourth detector through which the current marking is continuously detectable from another viewing angle than the three first detectors with reference to the feed direction, wherein the fourth detector is arranged on another side of the marking than the three first detectors with reference to the feed direction;

a processing device of the measuring device, wherein a respective size of the cross sectional surface is continuously determinable through the processing device from the image data generated by the first detectors and the fourth detector;

a control device through which the cutting device and/or the feed device are controllable using data for the respective cross sectional surface so that sequential portions with precise weights are cutable from a forward end of the food strand.

Through the method according to the invention the object can be achieved in a particularly advantageous manner in that the additional fourth detector facilitates detecting also portions which are not detectable by the other three known detectors since the additional fourth detector is arranged on "another" side of the marking compared to the other three detectors.

Such portions are formed in particular in edge portions of food strands with uneven shapes. For example it happens frequently that a forward and/or rear edge portion of a food strand tapers at a particularly steep angle, this means a "terminal plane" of the food strand is inclined or rotated by a small angle, for example 10° relative to a plane that is orthogonal to the feed direction. As soon as an edge portion of this type moves into a projection plane of the marking device forming the marking or is fed by the feed device into the projection plane, a forward tip of the food strand is already detected by the marking device, wherein the rear detectors known in the art, this means the detectors arranged in feed direction behind the marking, cannot detect this marking yet. This is due to the fact that for example the upper rear detector is impeded by an upper edge of the edge portion of the food strand which forms a portion of the terminal plane described supra and cannot detect the marking arranged on a steep terminal plane.

A situation of this type is provided at least as soon as an inclination of the end plane is steeper than an inclination of the rear detectors relative to the vertical plane. As soon as this is the case the detectors known in the art cannot detect the marking in the edge portion of the food strand since it is "hidden" between the circumferential edge of the terminal plane of the food strand.

However, through the fourth detector according to the invention which is arranged in feed direction on the other side of the marking or the projection plane the end plane can always be viewed completely from a front irrespective of an inclination of the terminal plane. The marking which is projected onto the food strand through the marking device therefore is continuously detectable independently from the inclination or the other configuration in particular of the edge portions of the food strand.

This has the effect that even edge portions can be precisely measured and can be cut by the cutting device with high precision. Wasted cutting material due to imprecise detection of edge portions with complicated shapes can therefore be omitted, wherein the food strand can be utilized to a higher percentage compared to known techniques.

From a device point of view the technical object is accordingly achieved through a fourth detector through which the current marking is continuously detected from an additional viewing angle, wherein the fourth detector viewed in feed direction is arranged on the other side of the marking compared to the other three detectors. The method step according to the invention can be performed through a device of this type in a particularly simple manner.

The device is particularly advantageous when the three detectors arranged on one side of the making are arranged on one plane, wherein all three detectors are arranged on a circular path around a center, wherein preferably two of the three detectors are arranged below the center and the third detector is arranged above the center. This arrangement of the detectors is particularly advantageous since viewing the food strand from a bottom side of the feed device is rendered more difficult compared to a viewing of the food strand from a top side due to the vision obstruction generated by the feed device. In order to be able to reliably detect the marking on the food strand therefore two of the three detectors arranged on one side of the marking device should be arranged below the food strand, thus below the described center. The plane which includes the described circular path is therefore typically oriented perpendicular to the feed device of the food strand.

With respect to positioning the detectors on the circular path in space an arrangement of this type is particularly advantageous in which an angle between two straight lines respectively connecting one of the lower detectors with the center is between 40° and 120°, preferably between 60° and 80°. This means that the two "lower" detectors should advantageously be arranged comparatively close to one another in order to be able to reliably detect the lower portion of the food strand that is covered up to a large extent by the feeding device. Though there is a gap between two conveyor belt elements of the feeding device in the plane in which the marking is located, so that the lower detectors can detect the edge contour on the surface of the food strand, however vision is obstructed compared to the vision upon the top side of the food strand. The tight "coverage" of the bottom side through the two lower detectors, however, can overcome this difficulty without problems.

In another embodiment of the device according to the invention it is provided, however, that an angle between a straight line connecting the detector arranged above the center with the center of the circular path and a straight line connecting one of the detectors arranged below the center with the center is between 120° and 170° preferably between 140° and 160°. Advantageously the "upper" of the three detectors arranged on one side of the marking should be arranged vertically above the food strand, this means the upper detector should be arranged in a vertical plane including the longitudinal axis of the food strand. Viewing the surface of the food strand directly from above is particularly advantageous in order to be able to detect the upper portion of the edge contour through a single detector.

According to another advantageous embodiment of the invention the fourth detector should also be arranged in a plane which is vertically oriented and which includes the longitudinal axis of the food strand. This way also the detector arranged on the other side of the marking can reliably view a top side of the food strand, wherein both detectors advantageous arranged above the food strand, one detector on one side of the marking and other detector on the other side of the marking, facilitate reliably detecting the edge portions of the food strand as described supra.

Advantageously an optical axis of at least one detector arranged above the food strand, in particular the optical axis of the fourth detector should enclose an angle between 20° and 60°, preferably between 40° and 50° with a plane that includes the marking and is orthogonal to the feed direction of the food strand. A slanted view defined by this angle of the detectors onto the food strand is configured particularly well to reliably detect the marking on the surface of the food strand.

In particular when the optical axes of all detectors are inclined at an angle between 20° and 60° relative to a plane oriented orthogonal to the feed direction of the food strand particularly reliable results can be obtained. Such slanting of the detectors greatly increases the complexity of detecting the marked surface contour since in particular the three detectors on one side of the projection plane are difficult to reconcile. In spite of the increased requirements with respect to computing power when evaluating camera images generated by slanted detectors a particularly high precision of volume—or mass computation is achieved since the slanting facilities reliably detecting surface contours with uneven shapes, in particular surface contours in the portion of the end pieces of the food strand.

It is furthermore advantageous when an optical axis of at least one detector, preferably of two detectors arranged below the food strand enclose an angle between 5° and 50°, preferably between 10° and 30° with a plane that includes the marking and that is orthogonal to the feed direction of the food strand.

BRIEF DESCRIPTION OF THE DRAWINGS

The method and the device according to the invention are subsequently described in more detail based on an embodiment with respect to drawing figures, wherein.

DETAILED DESCRIPTION OF THE INVENTION

The embodiment illustrated in FIGS. 1-6 illustrates a device 1 according to the invention for weight precise cutting including a feed device 2, cutting device 3 and a measuring device 4, wherein the measuring device 4 includes a marking device 5, four detectors 6', 6" and a processing device 7. The device 1 furthermore includes a control device 8 through which the feed device 2 is controlled as a function of the configuration of a food strand 9.

The feed device 2 is configured to feed the food strand 9 towards the cutting device 3, wherein the longitudinal axis 10 of the food strand 9 is oriented parallel to the feed direction of the feed device 2. Thus, the feed device 2 is typically configured as a conveyor belt, wherein the conveyor belt includes a plurality of conveyor belt elements arranged in series and adjacent to the transition gaps or at least close to the transition gaps.

Before the food strand 9 reaches the cutting device 3 it is measured through the measuring device 4. A measurement of this type of the food strand occurring during the feed movement is subsequently described.

The marking device 5 of the measuring device 4 in the illustrated embodiment includes three emitter elements 11 configured as laser modules. The emitter elements 11 are arranged relative to the feed device 2, so that the food strand 9 transported through the feed device 2 is run in a center portion through a projection plane 12 formed by the emitter element 11. Laser light emitted by the emitter elements 11 impinges on the food strand 9 when it is run through the projection plane 12 and the laser light is reflected by the surface 13 of the food strand. While the food strand 9 passes through the projection plane 12 a marking generated by the laser light moves on the surface 13 of the food strand 9 relative to the food strand 9, wherein the marking device 5 itself is fixated relative to the device 1 and the projection plane is not being moved. Thus, the marking only "appears" to move. The projection plane 12 is oriented orthogonal to the feed direction.

In order to detect the surface 13 of the food strand 9 from all sides, this means over an entire circumference of a cross section of the food strand 9 seamlessly with the laser light of the emitter elements 11 the three emitter elements 11 used herein are arranged about the food strand 9 in a plane that is arranged orthogonal to the feed direction of the food strand 9. In the illustrated embodiment an upper emitter element 11' is arranged vertically above the food strand 9 while two lower emitter elements 11" are arranged at a slant angle below the food strand 9. An optimum position of the emitter elements 11 can thus be different depending on the individual device. In the illustrated embodiment the two lower emitter elements 11" are arranged in the projection plane at an angle α of approximately 40° relative to vertical.

In order for a cross section of the food strand 9 to also be detectable from below the feed device 2 of the device 1 is divided in the projection plane 12, this means that a forward conveyor belt element 14 of the feed device 2 terminates upstream of the projection plane 12 and a rear conveyor belt element 15 only picks the food strand 9 up again downstream from the projection plane 12. Therefore the food strand 9 is free floating between the two conveyor belt elements 14, 15 of the feed device 2. In particular this separation of the feed device 2 facilitates that laser light projected by the lower emitter elements 11" onto the surface 13 of the food strand 9 is not blocked by the feed device 2 and a view of an edge contour of the food strand 9 generated by the emitter elements 11 is unobstructed for the detectors 6' so that the detectors can capture the edge contour.

A plane including the edge contour or the marking which plane coincides with the projection plane 12 is thus oriented orthogonal to the feed direction of the food strand 9.

The laser light of the emitter elements 11 of the marking device 5 is reflected by the surface 13 of the food strand 9 and can be subsequently detected by the four detectors 6', 6" of the measuring device 4 which are formed by cameras. Three of the four detectors 6', 6" are arranged on the same side of the projection plane 12 generated by the marking device 5, wherein the three detectors 6' are arranged on a rear side of the projection plane 12 oriented away from the cutting device 3. The fourth detector 6", however, is arranged on a front side of the projection plane 12 oriented towards the cutting device 3. The three rear detectors 6' are distributed similar to the three emitter elements 11' about the food strand 9 so that they can capture the edge contour reflected by the surface 13 of the food strand 9 seamlessly. A viewing direction of the rear detectors 6' is respectively oriented in a direction towards the food strand 9, wherein a directional component of the viewing direction that is parallel to the longitudinal axis 10 of the food strand 9 is oriented in feed direction of the food strand 9. Since the three rear detectors 6' are arranged downstream of the projection plane 12 the orientation of the viewing direction is necessary so that the detectors 6' can capture the edge contour.

The forward detector 6" according to the invention is arranged above the food strand 9 similar to the upper detector 6', wherein the forward detector 6", however, looks against the feed direction of the food strand 9. This means the directional component of the viewing direction of the detector 6" parallel to the longitudinal axis 10 of the food strand 9 is oriented against the feed direction. The fourth detector 6" is therefore configured to also detect cut outs of the edge contour projected onto the surface 13 of the food strand 9 which are not detectable for the detectors 6' arranged downstream of the projection plane 12. This case occurs in particular for food strands whose end sections or forward and rear edge portions taper at a steeper angle so that the upper rear detector 6' cannot detect the edge contour since it is covered by the food strand 9 itself. Thus, the fourth detector 6" facilitates a more complete detection of the edge contour generated through the emitter elements 11 and therefore achieves the technical object.

Figure 6:
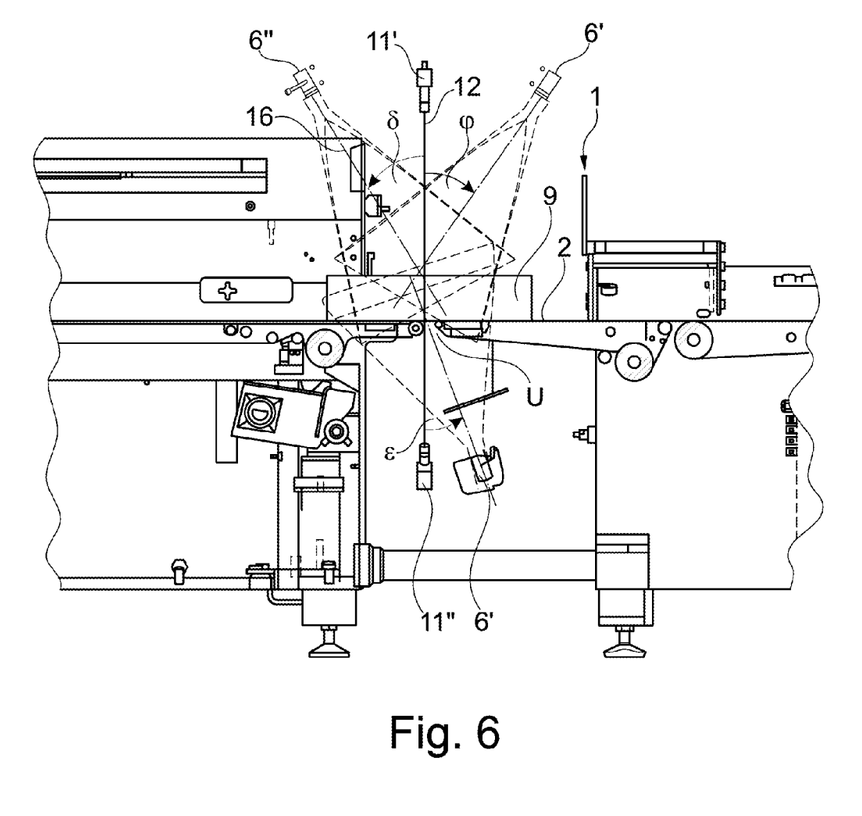
FIG. 6 illustrates a sectional view parallel to the feed direction of the food strand through the device according to the invention.

As apparent in particular from FIG. 6 of the instant application inclinations of optical axes 16 of the detectors 6', 6" preferably of all detectors 6', 6" against a vertical plane orthogonal to the feed direction of the food strand 9 should typically be in a range of 20° to 50°. In the illustrated embodiment the upper detectors 6', 6" are inclined relative to this plane by an angle δ of 30° and φ of also 30° and the lower detectors 6' are inclined by an angle ε of 20° to this plane. FIG. 6 also illustrates the transition gap U between the conveyor belt elements 14, 15 quite well.

Figure 5:
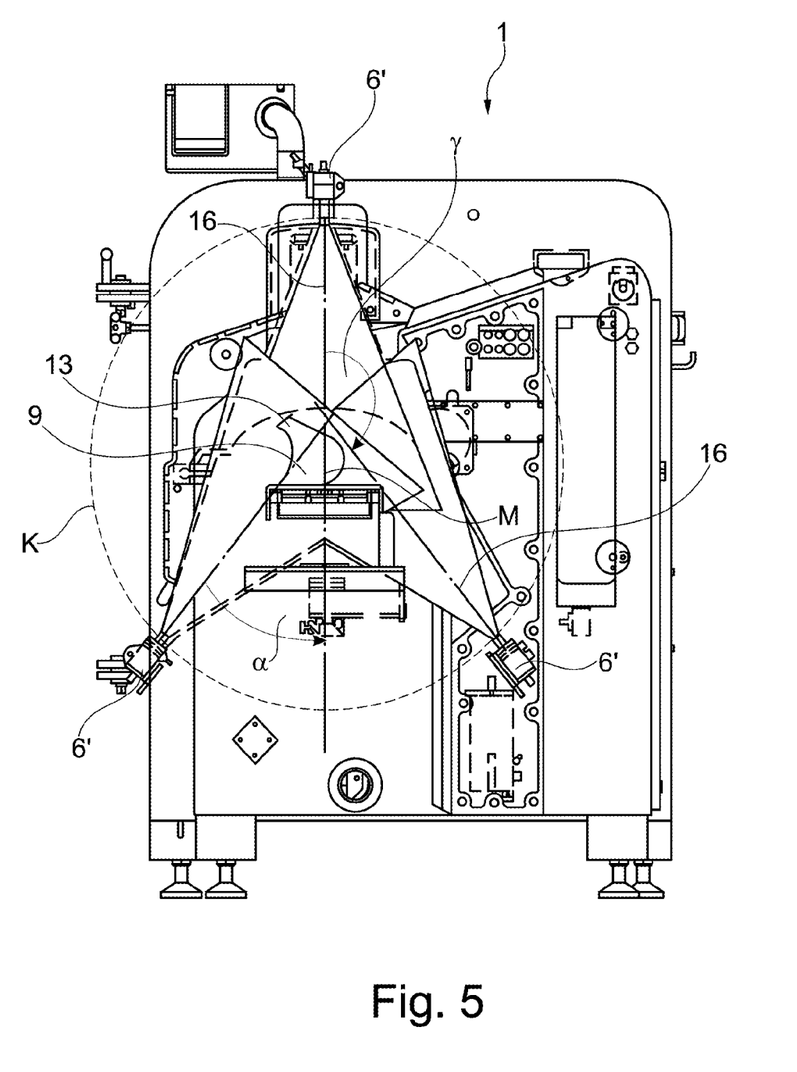
FIG. 5 illustrates a sectional view of the device according to the invention orthogonal to a feed direction of the food strand.

With respect to the arrangement of the three detectors 6' which are arranged on one side of the projection plane 12 it is furthermore apparent from FIG. 5 that these three detectors are arranged on a common circular path K with a center in a plane. In the present embodiment this plane is arranged orthogonal to the feed direction of the food strand 9. Like the emitter elements 11" the lower detectors 6' enclose an angle α of approximately 40° with a vertical plane extending through the longitudinal axis 10 of the food strand 9. The upper detector 6', however, is arranged in the plane and respectively encloses an angle γ of approximately 130° respectively with the optical axis 16 of the lower detectors 6'.

The edge contour detected through the detectors 6', 6" is eventually evaluated through the evaluation device 7 so that a cross sectional surface of the food strand 9 is continuously determined, this means information regarding the size of the cross sectional surface of the food strand 9 is provided, wherein the food strand is presently disposed in the projection plane 12. When knowing a density of the material from which the food strand 9 is formed the feed device 2 and/or the cutting device 3 can be subsequently continuously adjusted through the control device 8 so that a thickness of a slice that is to be presently cut off from the food strand is provided so that the product of cross sectional surface, thickness and density of the food strand 9 respectively yields a predefined mass value, for example 150 grams. Thus, the density has been previously determined through a separate preliminary scale and a volume measurement of the entire food strand 9. Through the quasi seamless detection of the edge contour of the food strand 9 even in edge portions of the food strand 9 that are formed in a highly irregular manner the cross sectional surface is determinable in a particularly precise manner through the device according to the invention. The precision with respect to the mass of the particular slices of the food strand 9 to be cut off consequently complies with most stringent requirements even in the previously critical edge portions of the food strand 9. Thus, the yield of slices cut with precise weights can be increased, for example for a pork chop strand with an average of 33 pieces to an average of 34 pieces which corresponds to an increase of approximately 3%. Finishing which was required in known methods for manual separation of the meat from the bone which was required for slices with imprecise weights can be substantially omitted according to the invention.

Figure 1:
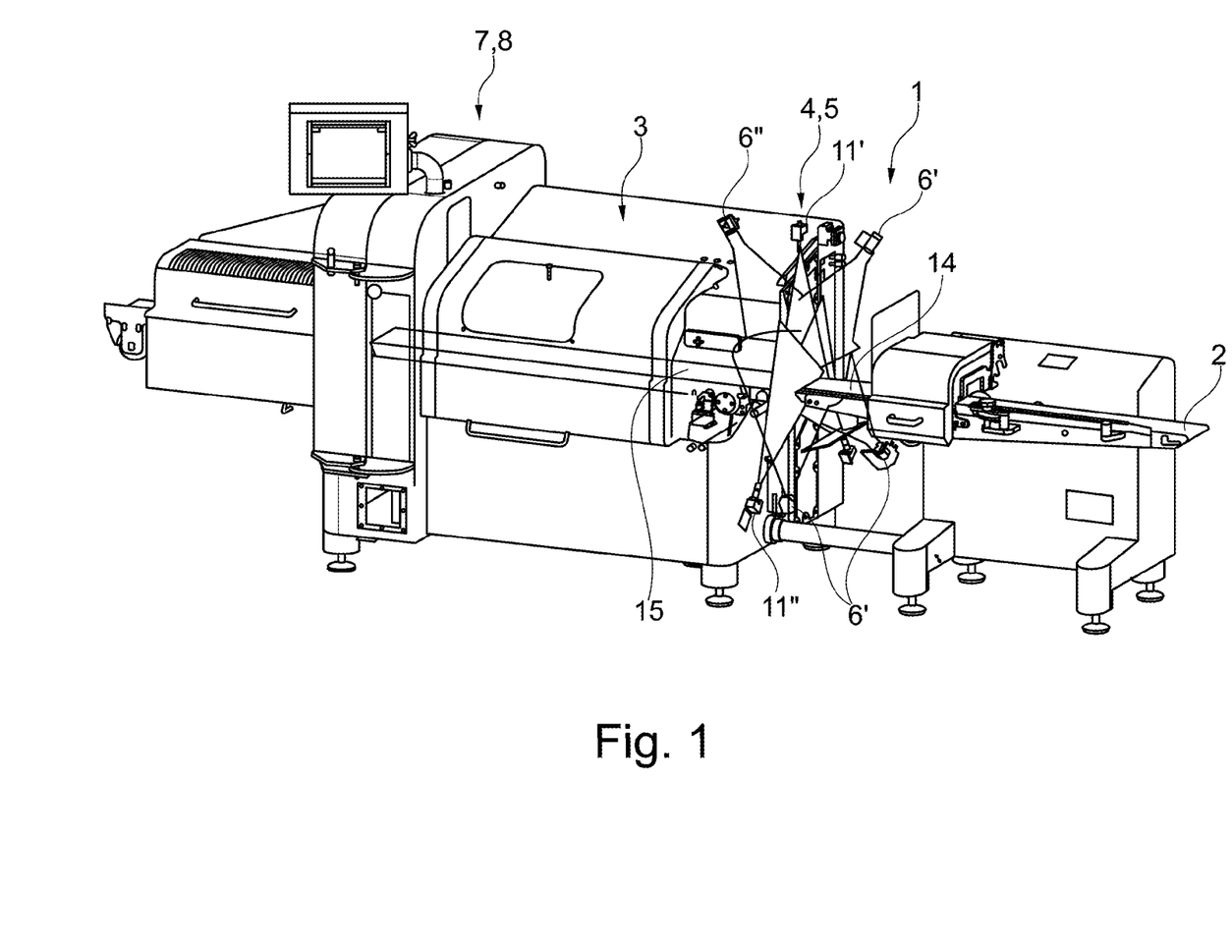
FIG. 1 illustrates a device according to the invention with a food strand to be cut.
Figure 2:
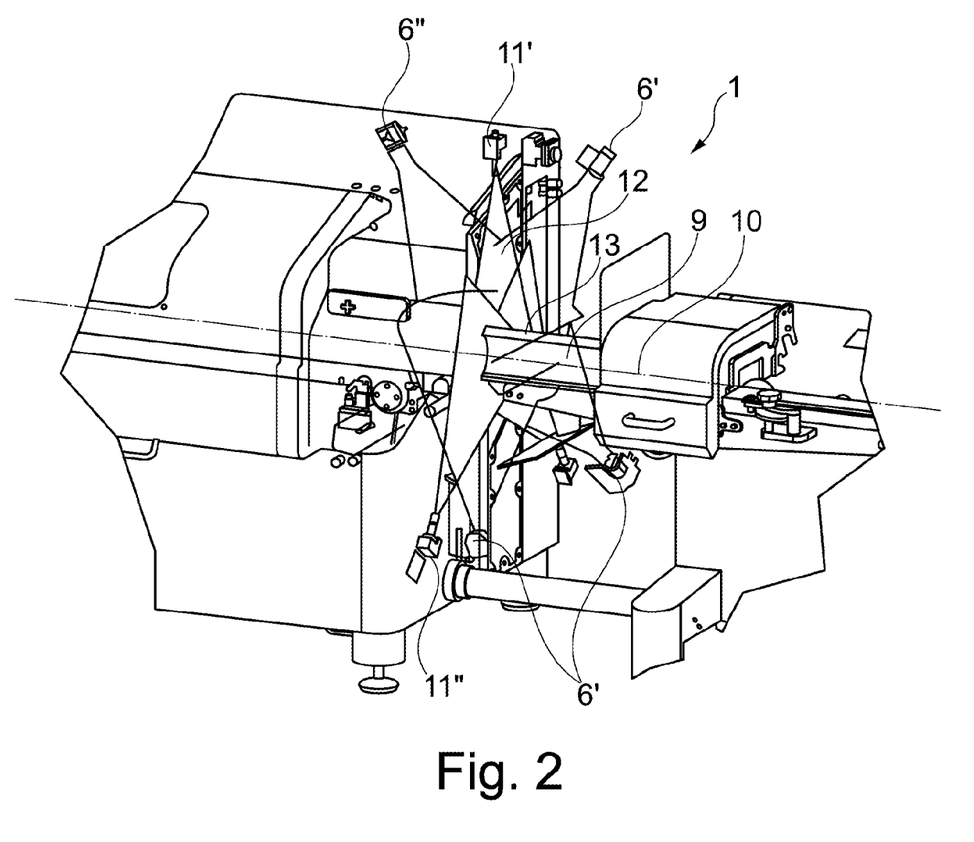
FIG. 2 provides an illustration similar to FIG. 1, however in a detail, wherein the food strand is in a starting position.
Figure 3:
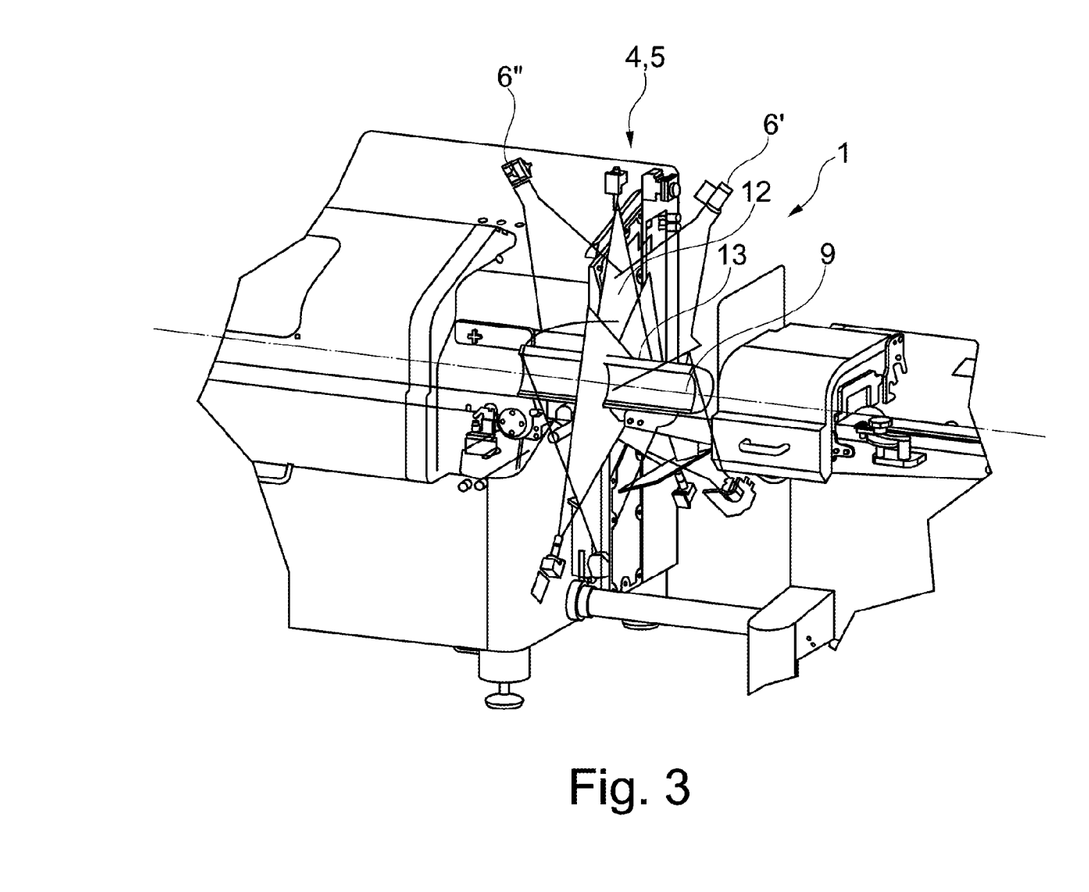
FIG. 3 provides an illustration similar to FIG. 2, however wherein the food strand is in a center position.
Figure 4:
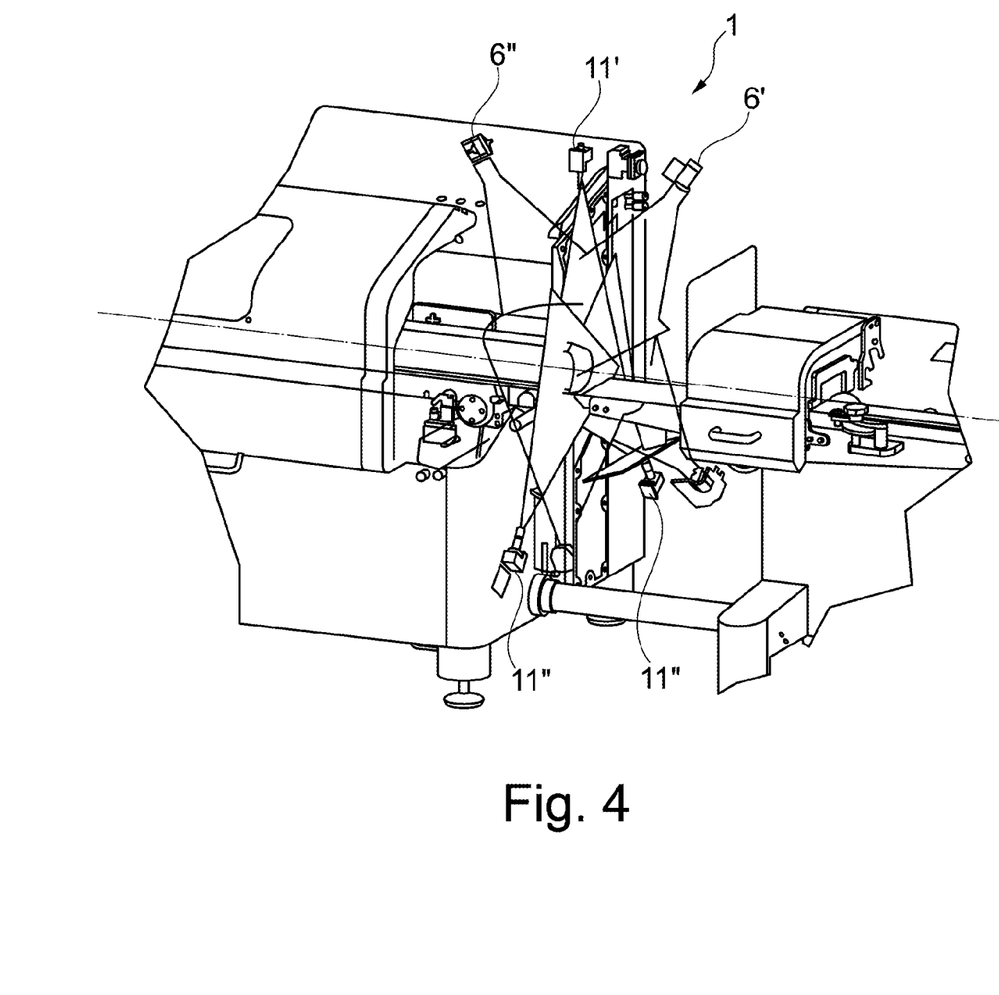
FIG. 4 provides an illustration similar to FIG. 2, however wherein the food strand is in an end position.

FIGS. 2-4 illustrated a food strand 9 in an exemplary manner which is run through the projection plane 12 of the marking device 5, wherein FIG. 4 illustrates the food strand 9 in a starting position in which the measurement through the emitter elements 11 and the detectors 6', 6" begins for the food strand 9. FIG. 3 illustrates a center position of the food strand 9 and FIG. 4 illustrates and end position in which a last cross section of the food strand 9 is detected by the measuring device 4. Laser light emitted by the emitter elements 11 and viewing areas of the detectors 6'. 6" are graphically emphasized in the figures and illustrate the functional principle. It is essential that the cross section measurement and volume computation according to the invention is continuously performed during the feed movement; this means during the passage through the projection plane 12 and the food strand 9 does not have to be slowed down or even stopped at any time.

| REFERENCE NUMERALS AND DESIGNATIONS | |
|---|---|
| 1 | device |
| 2 | feed device |
| 3 | cutting device |
| 4 | measuring device |
| 5 | marking device |
| 6', 6" | detector |
| 7 | processing device |
| 8 | control device |
| 9 | food strand |
| 10 | longitudinal axis |
| 11, 11', 11" | emitter element |
| 12 | projection plane |
| 13 | surface |
| 14 | rear conveyor belt element |
| 15 | front conveyor belt element |
| 16 | optical axis |
| α | angle |
| δ | angle |
| γ | angle |
| ε | angle |
| φ | angle |
| M | center |
| K | circular path |
| U | transition gap |

What is claimed is:

1. A method for cutting at least one food strand into portions with precise weights, comprising the steps:
feeding the food strand through a feed device in a feed direction relative to a machine frame towards a cutting device, wherein a longitudinal axis of the food strand extends parallel to the feed direction;
continuously measuring a respective cross section of the food strand during feeding with a measuring device at different locations of the food strand along the longitudinal axis of the food strand while the food strand passes through the measuring device;
continuously generating a marking on a surface of the food strand through a marking device of the measuring device that is fixated relative to a machine frame, wherein the marking is generated partially through a transition gap between two sequential conveyor belt elements, wherein the marking moves relative to the food strand in a direction of its longitudinal axis due to a feed movement of the food strand;
continuously detecting the marking through three first detectors respectively fixated relative to the machine frame, wherein the detecting is performed partially through a transition gap between the two sequential conveyor belt elements from different viewing angles, wherein the first detectors are arranged on identical sides of the marking with respect to the feed direction;
continuously detecting the marking through a fourth detector from another viewing angle with reference to the feed direction than the three first detectors, wherein the fourth detector is arranged on another side of the marking than the three first detectors with reference to the feed direction;
continuously determining a size of a cross sectional surface of the food strand through a processing device of the measuring device from image data generated by the first detectors and the fourth detector; and
controlling the cutting device or the feed device through a control device using data of the size of the cross sectional surface so that sequential portions with precise weights are cut off from a front end of the food strand.

2. A device for cutting a food strand into portions with precise weights, comprising:

a feed device through which a food strand is feedable in a feed direction, wherein a longitudinal axis of the food strand is oriented parallel to the feed direction during a feed movement;

a cutting device to which the food strand is feedable through the feed device;

a measuring device through which a cross sectional surface of the food strand is continuously determinable during feeding at different locations of the food strand with respect to the longitudinal axis of the food strand passing through the measuring device;

a marking device of the measuring device, wherein a marking is continuously generatable on a surface of the food strand through the marking device partially through a transition gap between sequential conveyor belt elements, wherein the marking moves relative to the food strand in a direction of the longitudinal axis of the food strand due to the feed movement;

three first detectors of the measuring device, wherein the marking is continuously detectable through the first detectors from different viewing angles partially through a transition gap between two sequential conveyor belts, wherein the first detectors are arranged on identical sides of the marking relative to the feed direction;

a fourth detector through which the current marking is continuously detectable from another viewing angle than the three first detectors with reference to the feed direction, wherein the fourth detector is arranged on another side of the marking than the three first detectors with reference to the feed direction;

a processing device of the measuring device, wherein a respective size of the cross sectional surface is continuously determinable through the processing device from the image data generated by the first detectors and the fourth detector;

a control device through which the cutting device or the feed device are controllable using data for the respective cross sectional surface so that sequential portions with precise weights are cutable from a forward end of the food strand.

3. The device according to claim 2,
wherein the three first detectors arranged on one side of the marking are arranged in one plane,
wherein all three first detectors are arranged on a circular path which extends about a center,
wherein two of the three first detectors are arranged below the center and a third first detector is arranged above the center.

4. The device according to claim 3, wherein an angle (α) between a straight line respectively connecting one lower first detector with a center and a vertical plane including the longitudinal axis of the food strand is between 20° and 60°.

5. The device according to claim 3, wherein an angle (γ) between a straight line which connects the first detector arranged above the center with the center of the circular path and another straight line which connects one of the first detectors arranged below the center with the center is between 120° and 170°.

6. The device according to claim 2, wherein an optical axis of at least one detector arranged above the food strand, encloses an angle (δ) between 20° and 60° with a plane that includes the marking and that is orthogonal to the feed direction of the food strand.

7. The device according to claim 2, wherein an optical axis of at least one first detector arranged below the food strand encloses an angle (ε) between 5° and 50° with a plane that includes the marking and that is orthogonal to the feed direction of the food strand.

8. The device according to claim 2, wherein the fourth detector is arranged in a plane that is oriented vertical and includes the longitudinal axis of the food strand.

9. The device according to claim 2, wherein the marking generated by the marking device is a line that is closed in itself and circumferential on the surface of the food strand, wherein the line extends completely within a projection plane which is oriented orthogonal to the feed direction.

10. A device for cutting a food strand into portions with precise weights, comprising:

a feed device through which a food strand is feedable in a feed direction, wherein a longitudinal axis of the food strand is oriented parallel to the feed direction during a feed movement;

a cutting device to which the food strand is feedable through the feed device;

a measuring device through which a cross sectional surface of the food strand is continuously determinable during feeding at different locations of the food strand with respect to the longitudinal axis of the food strand passing through the measuring device;

a marking device of the measuring device, wherein a marking is continuously generatable on a surface of the food strand through the marking device partially through a transition gap between sequential conveyor belt elements, wherein the marking moves relative to the food strand in a direction of the longitudinal axis of the food strand due to the feed movement;

three first detectors of the measuring device, wherein the marking is continuously detectable through the first detectors from different viewing angles partially through a transition gap between two sequential conveyor belts, wherein the first detectors are arranged on identical sides of the marking relative to the feed direction;

a fourth detector through which the current marking is continuously detectable from another viewing angle than the three first detectors with reference to the feed direction, wherein the fourth detector is arranged on another side of the marking than the three first detectors with reference to the feed direction;

a processing device of the measuring device, wherein a respective size of the cross sectional surface is continuously determinable through the processing device from the image data generated by the first detectors and the fourth detector;

a control device through which the cutting device and the feed device are controllable using data for the respective cross sectional surface so that sequential portions with precise weights are cutable from a forward end of the food strand.

* * * * *